Figure 1:
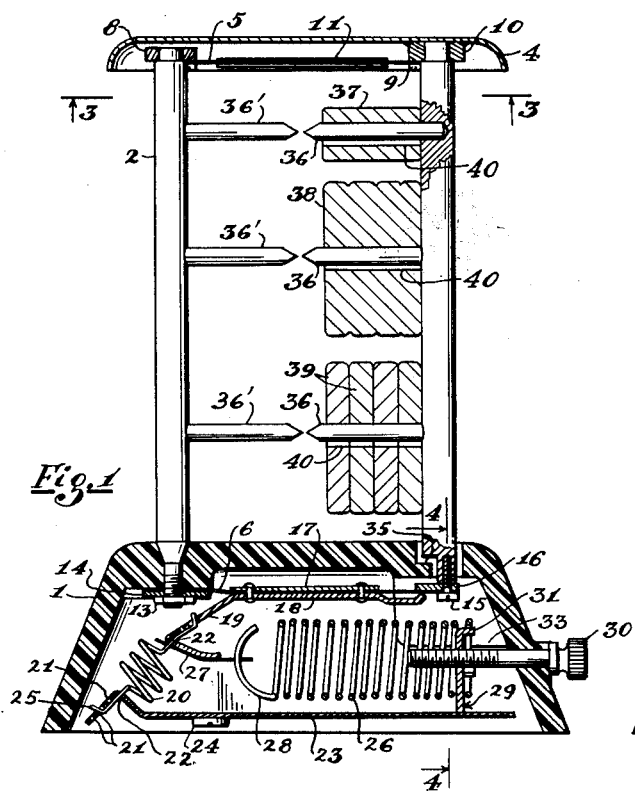

Jan. 4, 1955 W. STELZER 2,698,747
WEIGHING MECHANISM
Filed March 31, 1953

INVENTOR.
William Stelzer

United States Patent Office 2,698,747
Patented Jan. 4, 1955

2,698,747

WEIGHING MECHANISM

William Stelzer, Summit, N. J.

Application March 31, 1953, Serial No. 345,813

14 Claims. (Cl. 265—63)

The invention relates to weighing mechanisms and more particularly to a weighing mechanism using spring means as a resistant for opposing the load to be weighed, and complemental weights that can be added or removed from the load.

This application is a continuation-in-part of my application Serial No. 180,620, filed August 21, 1950.

The object of the invention is to produce a novel weighing mechanism that can be used as a postal scale or letter weigher indicating whether the article weighed is within certain weight limits.

Another object is to produce a highly sensitive and accurate weigher where friction and errors are reduced to a minimum considerably below present known beam or spring scales. It is particularly desired to eliminate the guesswork in reading the weight when near a limit, as for instance if a letter weighs approximately an ounce the weigher should indicate either over or under unless the letter weighs exactly one ounce.

A further object is to use the weighing principle disclosed in my copending application mentioned hereinbefore, where an adjustable resilient resistant opposes the gravitational force of the load, where the load is augmented with removable complemental weights to balance the resistant, and where the removed weights indicate the weight limits of the load weighed.

Yet another object is to arrange the removable weights on the load carrying member so that they can easily be shifted to and from the load carrying member.

The invention also includes certain improvements to make the resistant constant within the limits of its movement so that a full excursion of the load carrying member is obtained whenever a weight limit is passed. This is in contrast to the principle of operation in a spring scale where each increment in load added causes a further slight deflection of the spring, commensurate with its rate.

Figure 2:
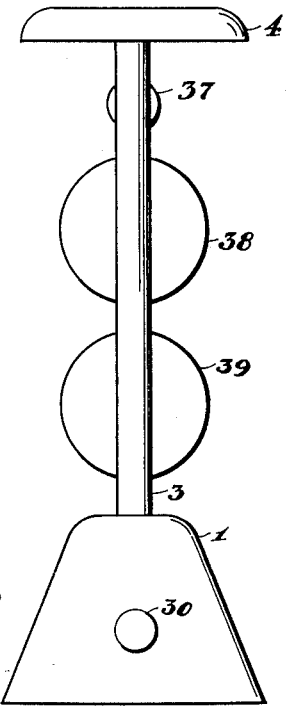
Figure 3:
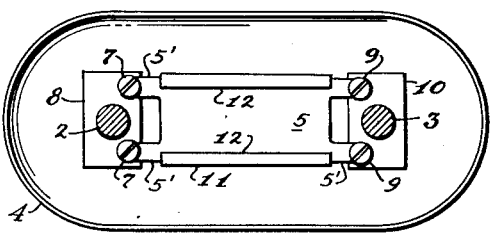

Other objects and advantages of this invention will be apparent from the following detailed description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a cross-sectional front elevation of the improved weigher, shown in a balanced position;

Fig. 2, a side elevation thereof;

Fig. 3, a section taken on lines 3—3 of Fig. 1; and

Figure 4:
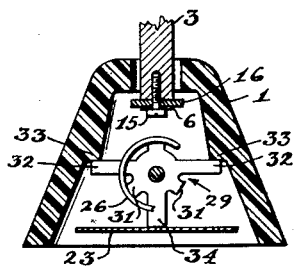

Fig. 4, a section taken on lines 4—4 of Fig. 1, one side of the resistant being broken off to better illustrate the construction of the adjusting nut.

Before explaining the present invention in detail, it is to be understood that the invention is not limited in its application to the details of construction and arrangement of elements illustrated in the accompanying drawing, since the invention is capable of other embodiments and of being practised or carried out in various ways. Also it is to be understood that the phraseology or terminology employed herein is for the purpose of description and not limitation.

The improved weighing mechanism comprises a base 1 carrying a fixed vertical post 2 spaced from and parallel with a removable load carrying member 3 having fixed to it at its upper end a platter 4 for carrying the load to be weighed. Load carrying member 3 is guided to move vertically by means of a pair of parallel links or arms 5 and 6. Upper link 5 is secured at one end as by screws 7, to a fixed bracket 8 in which post 2 terminates, the other end is secured with screws 9 to bracket 10 serving to join load carrying member 3 and platter 4 together. The link 5 consists of a thin resilient band having narrower terminal portions 5' which do the flexing. The central portion is reinforced by means of a piece of sheet metal 11 having sides 12 bent over around the leaf 5 to be rigid and firmly secured to the latter. The spacing of the terminal portions 5' imparts to the link a certain lateral stability so that the load carrying member must travel in a fixed path regardless of the location of the load on the platter. The lower link 6 consists of a narrower flexible leaf secured to and held by base 1 by means of nut 13 and rectangular washer 14, which fastening means also secure post 2 to base 1. The free end of leaf 6 is secured to the lower end of the load carrying member 3 by means of a screw 15 with a washer 16 interposed. The middle portion of link 6 is made rigid by a reinforcing plate 17 and lever 18 riveted together with link 6 between. Arm 19 of lever 18 is engaged by a compensating compression spring 20 anchored in holes 21 and 22 of bottom plate 23 secured to base 1 with screws 24. The upper end of this spring engages similar holes in arm 19, there being a plurality of holes 21 so that the compression or force of spring 20 may be adjusted by inserting ends 25 into different holes. The spring is biased to press against the same side of holes 22 regardless of the movement of lever 18, in order to prevent possible friction. The upper end extending through hole 22 of arm 19 is naturally urged toward the right hand wall of the hole by spring 26 which serves as the resistant for the weigher and is connected to arm 19 through an intermediate link or bend 27 of thin flexible material provided with a hole at each end, one being for the passage of the upper end of spring 20 and the other for engagement with hook 28 of spring 26. Arm 19 is extended towards the centerline of spring 26 to a point directly below the point of flexure of link 6 between the adjacent ends of washer 14 and reinforcing plate 17. This extension of arm 19 is curved along an arc whose radius has its locus near or preferably slightly below the point of flexure of link 6 just described. This assures movement of spring 26 on a straight line where the leverage or the distance between the point of flexure of band 27 and that of link 6 intermediate plate 17 and washer 14 is constant. In order to get the benefit of the curvature of the extension of arm 19 it is necessary that band 27 is very thin and flexible, otherwise the flexure would take place somewhere between the curvature and hook 28. The right hand end of spring 26 is adjustably held by a nut 29 engaged by an adjusting screw 30 seated in base 1. Nut 29 is stamped from a piece of sheet metal and has three lugs 31 bent over at a right angle to guide and concentrically support spring 26. The lateral wings 32 prevent the nut from turning as they engage the recesses 33 of base 1, while the vertical leg 34 rests against plate 23 which resiliently urges the nut upwardly where wings 32 are in contact with recesses 33. Thus the stationary part of spring 26 is always held in a fixed position so that the geometry of the spring suspension is never altered in a given position. As to wings 32 and leg 34 it should be pointed out that they are not exactly in the same plane as the central portion of the nut, but somewhat offset to conform to the pitch angle of the coils engaged by them so that there is no axial distortion of the spring.

Lever 18 at its right hand end extends to a point below the left hand edge portion of washer 16 and there engages flexible band 6 to transmit the upward force induced by spring 26 from lever 18 to the load carrying member 3. The portion of flexible band 6 between washer 16 and reinforcement 17 is free to flex, but the flexure takes place mainly at the point where lever 18 engages washer 16. Vertical movement of load carrying member 3 is limited by an abutment 35. For greatest accuracy it is desirable to make the vertical movement very small, but on the other hand it must be sufficient to be easily perceptible. Load carrying member 3 has horizontal chisel-edged pins or racks 36 carrying cylindrical complemental weights 37, 38, and 39. Post 2 has similar pins 36' onto which the weights may be shifted when removed from pins 36, the weights having axial holes 40 and the pins being axially aligned when the weigher is in balance. The chisel points of racks 36 and 36' serve as indicators. The weight can also be easily shifted in the extreme upward or downward position of the load carrying member as the chisel points of pins 36 and 36' and large holes 40 of the weights facilitate the operation. Weights 39 may each be one ounce when the weigher is used as a postal scale, weight 38 four ounces, and weight 37 half an ounce. Weight 38 may also consist of four separate weights of one ounce each. The weights shown are only by way of example.

In operation, the tension of spring 26 is adjusted by turning adjusting screw 30 while all weights are on pins 36 of the load carrying member and no load is on platter 4, until the weigher is in balance. Then the load to be weighed is placed on the platter which causes the load carrying member to descend until it rests on abutment 35. Following this weights are shifted onto the stationary pins 36' until load carrying member 3 ascends. The total weight on the stationary arms represents the weight for which postage must be paid.

Lever 18 acts like a bell crank, converting the pull of spring 26 to an upward force opposing the gravitational force acting on load carrying member 3. Due to the rate of the spring, this force is greater when the load carrying member is in the lower position, and smaller in the upper position. To compensate for the difference, spring 20 presses against arm 19 and causes a turning moment acting on lever 18 in reverse to the changing force induced by spring 26. In order to obtain the best compensation, spring 20 should act directly on the dead center of arm 19 where the axial line of spring 20 points at the point of flexure of link 6 intermediate washer 14 and plate 17 when the load carrying member is in the intermediate or balanced position. During the short movement, the turning moment produced by spring 20 is zero when the spring acts on dead center, and beyond that point it is positive in one direction and negative in the other. Thus the object of spring 20 is to produce maximum lability in the vertical movement of the load carrying member. Since spring 20 also offers a certain resistance to the bending of its axis and is purposely biased in a direction to augment the turning moment induced by spring 26, and since the flexible links 5 and 6 also add their forces to the resistant, it is obvious that the total resistant force and its rate of change are products of all the resilient elements and that spring 20 must have a sufficient force in its axial direction to compensate for the overall rate of change of the resistant force. Actually, however, spring 20 is very light and its force is only a minor fraction of the gravitational force acting on the load carrying member whose weight must be carried by the flexible band 6 intermediate washer 14 and plate 17. Thus spring 20 assists band 6 in a small degree to support the weight. In this respect it must be borne in mind that spring 26 puts band or link 6 under tension so that only tensile strength is required by the flexible band 6 intermediate washer 14 and plate 17.

While links 5 and 6 preferably are of non-friction flexible bands having a point of flexure whose location is not clearly defined, it is obvious that pivoted or hinged links could be used without departing from the scope of the invention. Due to the small movement of the parallel links and the short lengths of the flexible portions, the point of flexure is narrowed down to such a small area as to be in effect the same as the bending axis of a hinge. For this reason the parallel links are considered pivoted at one end to a stationary member and at the other to a movable member.

Having thus described my invention, I claim:

1. A weighing mechanism comprising a stationary frame, a vertically movable load carrying member to support a load to be weighed, means to restrict the movement of said load carrying member to a vertical path where all points of said member move at equal velocity, part of said means comprising a lever pivotally connected to said frame and the end of a horizontal arm of said lever being connected to said load carrying member, a resistant comprising at least one spring arranged to act on said lever to oppose the gravitational force acting on said load carrying member, adjusting means to adjust the force of said resistant, a predetermined number of counterweights, said resistant being adjustable to counterpoise said gravitational force with no load and the total number of said counterweights on said member, a rack comprising at least one horizontal pin extending from said load carrying member to support said counterweights, and a stationary rack comprising at least one horizontal pin extending from said frame in approximate alignment with said pin of said first mentioned rack so that said counterweights can be shifted from one rack to the other, said pins serving as indicating means to indicate a balance between the opposing force of said resistant and said gravitational force.

2. The construction as claimed in claim 1, where said lever is pivotally connected to said frame by flexible means and where said horizontal arm is connected to said member by other flexible means.

3. A weighing mechanism having a stationary member, a load carrying member having a platter, a pair of horizontal parallel links pivoted at one end to said stationary member and at the other end to said load carrying member to limit the latter to a vertical movement where all points of said platter travel at equal velocity, means on said load carrying member to support complemental removable weights, a resilient resistant consisting of at least one helical spring arranged to oppose the gravitational force acting on said load carrying member, means for adjusting the force of said resistant to balance said gravitational force when all weights are carried by said load carrying member and no load is on said platter, means to limit the movement of said load carrying member to a short vertical distance, and means to compensate for the rate of change of the force of said resistant to obtain lability in the vertical movement of said load carrying member.

4. A weighing mechanism according to claim 3 where said stationary member consists of a base and an upright post attached thereto, said means on said load carrying member for supporting said complemental removable weights being in the form of horizontal arms extending from said load carrying member, similar arms extending from said upright post opposite siad first mentioned arms so that said weights can be shifted from said arms on said load carrying member to said opposite arms on said upright post, whereby said weights are not removable from said weighing mechanism.

5. The construction as in claim 4 where instead of a plurality of arms only one arm extends from said load carrying member and an opposite arm extends from said upright post, the ends of said arms being chisel-pointed to serve as indicator means.

6. The construction as claimed in claim 3, where said horizontal parallel links are reinforced to be rigid in the center and have flexible pivots at the ends where they are secured to said stationary member and to said load carrying member.

7. The construction as claimed in claim 3 where said resistant consists of a horizontal helical tension spring adjustably secured to said stationary member at one end, a lever arm extending from one of said links so that said one link and said lever arm form a bell crank, flexible means for securing the other end of said tension spring to the end of said lever arm, the latter being so disposed that the point of flexure moves horizontally along the axis of said tension spring.

8. The construction as claimed in claim 7, where the end of said lever arm is curved according to an arc described by a radius whose locus is slightly below the point of flexure of said link where it is connected to said stationary member.

9. The construction as claimed in claim 7, and a compression spring acting against said lever arm in a direction where the axis of said compression spring points at said point of flexure of said link where it is pivoted to said stationary member, said compression spring serving as said means to compensate for the rate of change of the force of said resistant.

10. The construction as claimed in claim 9, where said compression spring is adjustable so that its pressure can be adjusted to fully compensate for the rate of change of the force of said resistant.

11. The construction according to claim 1, where said counterweights have central holes through which said pins may extend to support said counterweights.

12. The construction according to claim 1 where said pins have free chisel-pointed ends to serve as said indicating means.

13. A weighing mechanism having a stationary member, a load carrying member having a platter, horizontal parallel links one above the other, each having one end connected to said stationary member by flexible bands such as leaf springs and an opposite end flexibly connected to said load carrying member to restrict the latter to a vertical movement where all points of said platter travel at equal velocity, a horizontal arm extending from said load carrying member to support complemental removable weights, another arm extending horizontally from said stationary member opposite from and in approximate alignment with said first mentioned arm to facilitate shifting of said complemental weights from said first mentioned arm to said arm extending from stationary member, a resistant arranged to oppose the gravitational force acting on said load carrying member, means for adjusting the force of said resistant to balance said gravitational force when all of said weights are carried by said load carrying member and no load is on said platter, means to limit the movement of said load carrying member to a short vertical distance, and means to compensate for the rate of change of force or resistance to bending of said flexible bands to obtain lability in the vertical movement of said load carrying member.

14. The construction as claimed in claim 13, where a plurality of sets of said arms are incorporated.

References Cited in the file of this patent

UNITED STATES PATENTS

| | | |
|---|---|---|
| 1,018,173 | Dunn | Feb. 20, 1912 |
| 1,682,506 | Hansen | Aug. 28, 1928 |
| 2,584,950 | Weckerly | Feb. 5, 1952 |

FOREIGN PATENTS

| | | |
|---|---|---|
| 16,769 | Germany | Jan. 31, 1882 |